UNITED STATES PATENT OFFICE.

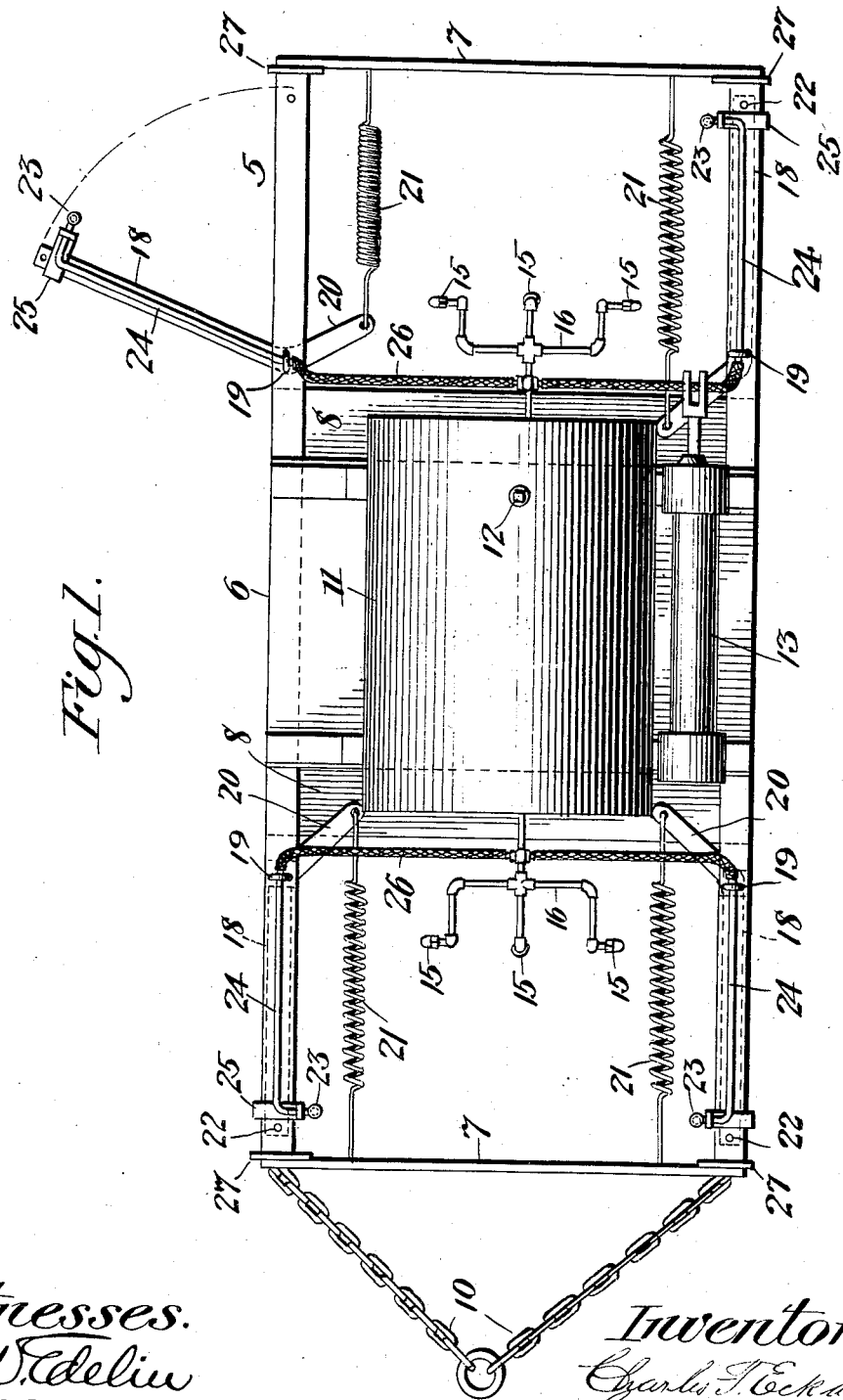

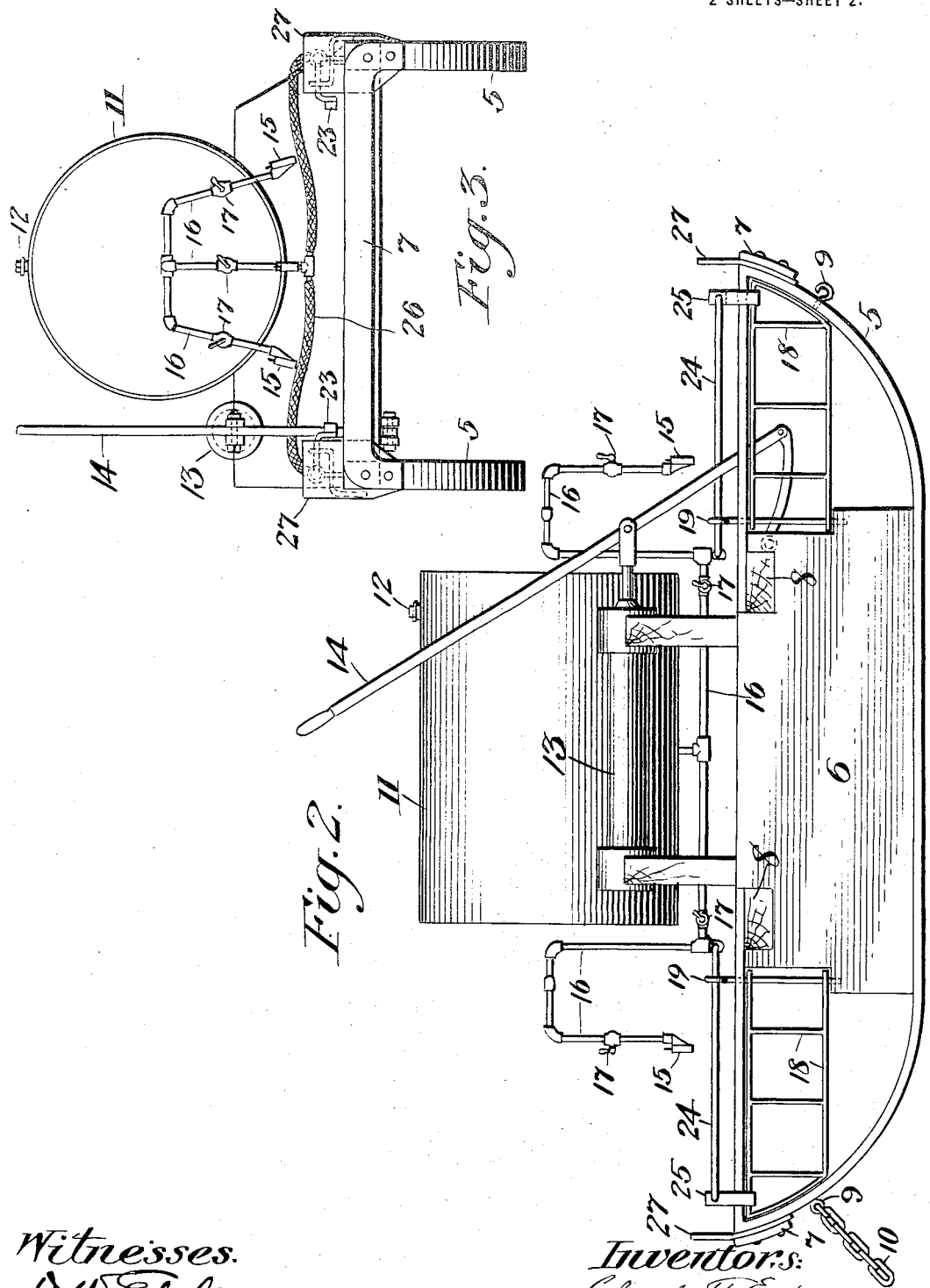

CHARLES FRANKLIN ECKART AND GUIDO GIACOMETTI, OF OLAA, TERRITORY OF HAWAII.

SPRAYING-SLED.

1,172,686.      Specification of Letters Patent.     Patented Feb. 22, 1916.

Application filed June 17, 1914. Serial No. 845,555.

*To all whom it may concern:*

Be it known that we, CHARLES FRANKLIN ECKART, a citizen of the United States, and GUIDO GIACOMETTI, a citizen of Italy, residents of Olaa, in the county and Territory of Hawaii, have invented certain new and useful Improvements in Spraying-Sleds; and we do hereby declare the following to be a full, clear, and exact description of the invention, such as will enable others skilled in the art to which it appertains to make and use the same.

This invention relates to devices for destroying or checking the growth of weeds or grass by spraying the same with a solution containing arsenite of soda or other deleterious material.

Its object is to provide an efficient device of this character, which shall be particularly adapted to be drawn between the rows of cultivated crops, such as sugar cane, which are grown in rows, to destroy or check the growth of the weeds and grass growing between the said rows.

A further object is to provide means whereby this device, when drawn between the rows, will automatically cause a spray of the deleterious solution to be projected upon the weeds or grass growing in any break or opening in the said rows, such occasional open spaces in the rows usually being weedy.

Our device contemplates, a sled adapted to be drawn between the rows of cane or the like, a tank carried thereon to hold the deleterious solution, an air pump for obtaining and maintaining a pressure within the tank, means for projecting this solution in the form of spray on the ground over which the sled passes, arms hinged to the sled on opposite sides, means for causing the arms to swing out and project laterally from the sled, and a nozzle carried by each of the said arms and connected to the said tank for spraying the ground under the said arms.

Both ends of the sled may be made alike, and the arms and the spraying devices may be in duplicate at each end of the sled, so that the sled may be drawn in either direction between the rows, and thus prevent the necessity of having to turn the sled around. The arm on each side of that end of the sled which at the time is the forward end is hooked or pinned within the runner, while the arms on the sides of the rear end are permitted to swing. When an arm projecting from the sled encounters the cane or the like in the row, as the sled moves forward, the arm is pushed thereby and caused to swing rearward toward the runner, against the action of an attached spring, so that the spray from the nozzle carried by the said arm is projected on the ground near this runner. When, however, a break or opening occurs in a row, there being no cane or the like to interfere with the arm and cause it to swing rearward, the arm is immediately extended laterally from the sled by the action of the attached spring, and consequently the spray from the nozzle supported by the arm is projected upon the weeds or grass growing in this open space in the row. The arm is thus operated automatically by interference with the growing crop, so that the spray is not projected upon the rows except when an open space occurs in the row.

In the accompanying drawings, forming a part of this specification, similar characters of reference indicate corresponding parts in all the views.

Figure 1 is a plan view of a device for the purpose described embodying the invention; Fig. 2 is a side elevation of the same; and Fig. 3 is an end elevation of the same.

Referring to the drawings, the two runners 5 are similar with both of their ends curved as shown. The middle or central portion of each of the runners 5 is filled in with wood 6 of substantially the same thickness as the width of the runner 5. The extreme ends of these runners 5 are connected by the metal cross-bars 7, and the wooden sides 6 are connected by the wood cross-bars 8. The cross-bars 7 and 8 thus rigidly separate the runners 5, the width of the sled being made suitable so that it may pass between the rows. A hook or eye-bolt 9 is provided in the ends of each runner 5, so that a chain 10 may be fastened to either end of the sled, for attaching the animal in a well known manner, so that the sled may be drawn in either direction.

The container or tank 11 is mounted on the sled as shown. This tank may be filled with the deleterious solution by removing the plug 12. The air pump 13, operated by the hand lever 14, is provided to produce a pressure within the tank 11. The nozzles 15 are connected by the pipes 16, provided with the valves 17, to the tank 11, as shown. The solution may thus flow from the tank 11 and issue from the nozzles 15 in the form of spray which is projected downward onto the weeds or grass or ground over which and near which the sled is drawn. The issue of this spray may be regulated by means of the valves 17.

A gate-shaped arm 18 is hinged on a hinge-pin 19 at each end of each of the two wooden sides 6 within the runners 5. Each arm 18 is provided with a projection 20. A tension spring 21 connects the end of each projection 20 with a cross-bar 7, so that each arm 18 is pulled by a spring 21 and when operating is swung out and projects laterally from the side of the sled. The arms 18 at one end of the sled, which at the time is the forward end, are secured within the runners 5, for example, by means of a pin 22 passed through a hole in the runner 5 and in the arm 18. A nozzle 23 is secured to the end of each pipe 24 supported by the hinge-pin 19 and by a clip 25 attached to the arm 18. Each pipe 24 is flexibly connected by a hose 26 to the pipe 16. Guard plates 27 are secured to the ends of the cross-bar 7 to protect the nozzles 23 and the pipes 24 when the arms 18 are in the non-operative position.

In operation, the tank 11 having been filled with the deleterious solution and a pressure obtained therein by the pump 13, the sled is drawn through the cultivated field between the rows of cane or the like by a mule or horse for example attached to the chain 10 at one end of the sled. By operating the valves 17, the solution under pressure in the tank 11 is permitted to flow through the pipes 16 and issue from the rear set of nozzles 15 in a fine spray, which is projected downward onto the weeds or grass or ground over which the sled passes. The forward arms 18 are secured within the runners 5, while the rear arms 18 are allowed to swing on their hinge-pins 19. The solution flowing from the tank 11 through the pipe 16 also passes through the hose 25, the pipes 24, and issues from the nozzles 23 in a fine spray on the weeds or grass or ground underneath the same. When an arm projecting from the side of the sled encounters cane or the like in the row, as the sled moves forward, the arm is pushed and caused thereby to swing rearward on its hinge-pin 19, against the action of the spring 21, so that the spray from the nozzle 23 carried by the said arm is projected near the runner 5 and not over the row nor on the cane or the like. When, however, an opening occurs in the row, as there is no interference by the cane or the like, the arm 18 is immediately swung outward and projects laterally from the side of the sled, by the action of the spring 21, so that the spray from the nozzle 23 supported thereby is projected on the ground in the opening in the row, which open space is usually weedy. It will now be noted, that the device not only sprays between the rows of cane or the like, but will also spray any occasional open spaces in the rows, the arms 18 being automatically operated by interference with the growing crops as the sled is drawn forward between the rows.

We are aware that it is not new to apply a deleterious material in solution contained in a tank under pressure for the purpose of destroying or checking the growth of weeds and grass; but

We claim:

1. Apparatus for spraying the ground between adjacent rows of cultivated plants with deleterious material, comprising a sled, a tank carried thereby for holding the deleterious material, a cross member bracing the end of the sled, an arm pivoted to each side of the sled having an inwardly directed projection, a spring interposed between each of said projections and said cross member, a nozzle carried by each of said arms, and means to supply the deleterious material from said tank to each of said nozzles.

2. Apparatus for spraying the ground between adjacent rows of plants with deleterious material, comprising a sled, a tank mounted thereon, arms pivoted to the sled, a nozzle carried by each of said arms, connections between said nozzles and the tank, said arms being normally yieldingly held in extended positions whereby each nozzle may deliver the material to the ground to one side of the sled, and means for locking said arms in their inoperative positions in alinement with the runners of the sled.

3. Apparatus for spraying the ground between adjacent rows of plants with deleterious material, comprising a sled, a tank mounted thereon, a pair of swinging arms associated with each end of the sled and pivotally connected therewith, a nozzle carried by each of said arms, connections between the nozzles and the tank, means to normally yieldingly hold said arms in extended position, and means to lock said arms in their inoperative position in alinement with the runners of the sled whereby said sled may be drawn in either direction between the rows of plants.

In testimony whereof we affix our signatures, in presence of two witnesses.

CHARLES FRANKLIN ECKART.
GUIDO GIACOMETTI.

Witnesses:
  J. D. AITKEN,
  C. A. SHORT.